United States Patent
Taylor et al.

(10) Patent No.: US 9,906,654 B1
(45) Date of Patent: Feb. 27, 2018

(54) WHITE AREA DEFECT DETECTION FOR IMAGE BASED CONTROLS APPLICATIONS

(71) Applicant: Xerox Corporation, Norwalk, CT (US)

(72) Inventors: Douglas R. Taylor, Webster, NY (US); Eliud Robles Flores, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/366,333

(22) Filed: Dec. 1, 2016

(51) Int. Cl.
*H04N 1/393* (2006.01)
*H04N 1/00* (2006.01)

(52) U.S. Cl.
CPC ..... *H04N 1/00005* (2013.01); *H04N 1/00015* (2013.01); *H04N 1/00037* (2013.01); *H04N 1/00074* (2013.01); *H04N 1/393* (2013.01); *H04N 2201/0094* (2013.01)

(58) Field of Classification Search
CPC .............. H04N 1/00005; H04N 1/00015
See application file for complete search history.

(56) References Cited

U.S. PATENT DOCUMENTS

| | | | |
|---|---|---|---|
| 7,106,912 B2 | 9/2006 | Kokubo et al. | |
| 7,764,893 B2 | 7/2010 | Banton et al. | |
| 8,571,269 B2 | 10/2013 | Wu et al. | |
| 8,605,303 B2 | 12/2013 | Wu et al. | |
| 8,891,135 B2 | 11/2014 | Hoover et al. | |
| 2004/0100622 A1* | 5/2004 | Kaltenbach | B41J 11/008 355/40 |
| 2006/0110009 A1 | 5/2006 | Klassen et al. | |
| 2008/0226156 A1 | 9/2008 | Ota | |
| 2009/0041370 A1* | 2/2009 | Wu | G03G 15/5062 382/260 |
| 2013/0021637 A1 | 1/2013 | Kogan et al. | |

* cited by examiner

*Primary Examiner* — Ibrahim Siddo
(74) *Attorney, Agent, or Firm* — Gibb & Riley, LLC (57) ABSTRACT

Methods and systems print an original image to form a printed sheet, scan the printed sheet, and overlay the original image on an area of the scanned image where original image is located, to produce an overlay image. A border is added to the original image in the overlay image to modify the original image into an enlarged original image. Markings from an area of the overlay image where the enlarged original image is positioned are removed to produce a white space image. Defects in the white space image are detected and highlighted by adding highlight markings to the white space image where the defects are located, to produce a defect image. The defect image is displayed.

20 Claims, 8 Drawing Sheets

WHITE AREA DEFECT DETECTION FOR IMAGE BASED CONTROLS APPLICATIONS

BACKGROUND

Systems and methods herein generally relate to detecting defects in white spaces (non-printed spaces) of printed sheets using a scanner.

A valuable image based applications (IBC) performs defect detection. The ability to detect defects in printed output is very useful, and this is especially true for uses that have fully automated workflows and rely on tracking systems to enhance productivity and reduce customer complaints. There are different defect detection areas of concern: "white areas" and "image areas." The "image area" defects receive the most attention, however, the "white area" defects are often neglected, mostly because they are difficult to see visually. "White area" is defined as that location on a page that has no image content, i.e. no toner/ink, etc. There are however many examples of "white area" defects that are visually offending, including paper impurities, spitting, comets, charge dots, and foxfire streaks.

SUMMARY

Exemplary methods herein can print an electronic original image by printing image markings corresponding to the electronic original image on print media, using a printing engine to produce a printed sheet, or can receive a previously printed sheet. The printed sheet has the image markings and white space in areas outside the areas of the image markings. Therefore, the white space is unprinted areas of the printed sheet.

Methods herein can automatically or manually scan the printed sheet using a scanner (potentially positioned to automatically receive the printed sheet from the printing engine). The scanner therefore produces an electronic scanned image. These methods automatically or manually receive the electronic scanned image from the scanner into a processor (that is operatively connected to the scanner and the printing engine). The processor also stores the electronic original image.

Such methods can then automatically overlay the electronic original image on an area of the electronic scanned image where the image markings are located to produce an electronic overlay image, using the processor. In this processing, the processor sets the size of the electronic original image to be the same size as the image markings in the electronic overlay image.

In addition, these methods automatically add a border to the electronic original image in the electronic overlay image to modify the electronic original image into an enlarged original image in the electronic overlay image, again using the processor. The border is larger than the electronic original image in the electronic overlay image. For example, the border increases the size of the electronic image by at least 10%, at least 20%, at least 30%, etc.

Methods herein also automatically remove markings from an area of the electronic overlay image where the enlarged original image is positioned (using the processor) to produce an electronic white space image, for example by replacing the enlarged original image with white pixels. Then these methods automatically detect defects in the electronic white space image by identifying non-white pixels in the electronic white space image, again, using the processor. Further, such methods automatically highlight these defects by adding highlight markings to the electronic white space image, where the defects are located, to produce an electronic defect image, using the processor. For example, the highlight markings comprise geometric shapes enclosing the defects. Thus, these methods can automatically display the electronic defect image, using a display device operatively connected to the processor.

Apparatuses herein include machines, printers, systems, etc., and such apparatuses include, among other components, a printing engine printing an electronic original image. Such printing is performed by printing image markings corresponding to the electronic original image on print media to produce a printed sheet. The printed sheet has the image markings and white space (unprinted areas of the printed sheet). In addition, such apparatuses include a scanner positioned to automatically receive the printed sheet from the printing engine, a processor operatively connected to the scanner and the printing engine, a display device operatively connected to the processor, etc. The processor stores the electronic original image.

The scanner produces an electronic scanned image by scanning the printed sheet, and the processor receives the electronic scanned image from the scanner. The processor overlays the electronic original image on an area of the electronic scanned image where the image markings are located to produce an electronic overlay image. The electronic original image has the same size as the image markings in the electronic overlay image. The processor also adds a border to the electronic original image in the electronic overlay image to modify the electronic original image into an enlarged original image in the electronic overlay image. For example, the border increases the size of the electronic image by at least 10%, at least 20%, at least 30%, etc.

The processor removes markings from an area of the electronic overlay image where the enlarged original image is positioned (e.g., by replacing the enlarged original image with white pixels) to produce an electronic white space image. The processor detects defects in the electronic white space image by identifying non-white pixels in the electronic white space image. The processor highlights the defects by adding highlight markings (e.g., geometric shapes enclosing the defects) to the electronic white space image where the defects are located to produce an electronic defect image. The display device displays the electronic defect image.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, there are many examples of "white area" defects that are visually offending. Therefore, the systems and methods herein provide detection methods and systems to find and highlight "white areas" defects using a scanned image and a source image. Stated simply, these systems and processes overlay a scanned image and original image, create a mask by thresholding the registered original image, perform edge detection on the scanned image (e.g., using canny filter), and use masked edges (leaving only white area structures to be analyzed for defects). To handle any misregistration of the source and scanned images, a masking strategy is used around the edges of the "image areas."

More specifically, exemplary systems and methods herein can print an electronic original image by printing image markings corresponding to the electronic original image on print media, using a printing engine to produce a printed sheet, or can receive a previously printed sheet.

Figure 1:
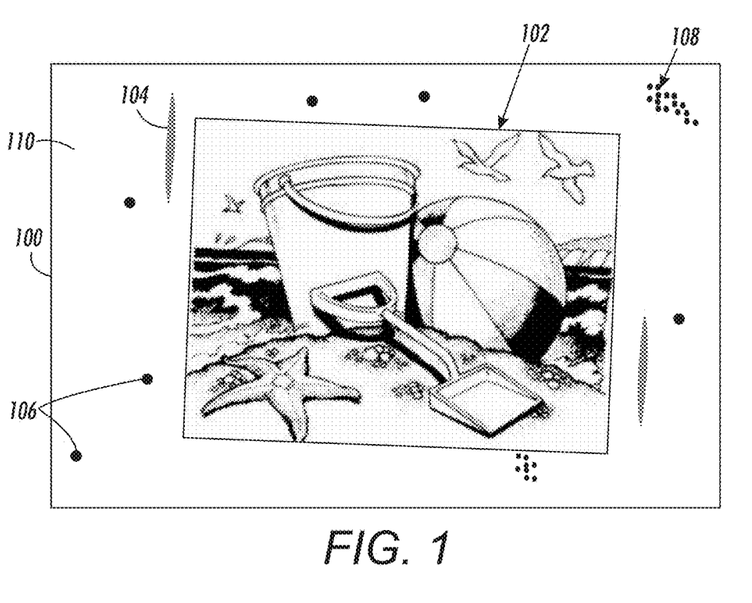
FIG. 1 is a schematic diagram illustrating a scanned image of a printed sheet.

Systems and methods herein can automatically or manually scan the printed sheet using a scanner (potentially positioned to automatically receive the printed sheet from the printing engine). The scanner therefore produces an electronic scanned image. FIG. 1 is a schematic diagram illustrating this scanned image 100 of a printed sheet. The printed sheet has the image markings 102 and white space 110 in areas outside the areas of the image markings 102. Therefore, the white space 110 is unprinted areas of the printed sheet; however, undesirable defects (marks) 104, 106, and 108 can be printed in the white space 110. For example the defects can include streaks 104, dots 106, spits 108, comets, picking, etc. These defects are often a result of printing errors, but can include print media defects.

These systems and methods automatically or manually receive the electronic scanned image 100 from the scanner into a processor (that is operatively connected to the scanner and the printing engine). The processor also stores the electronic original image 112.

Figure 2:
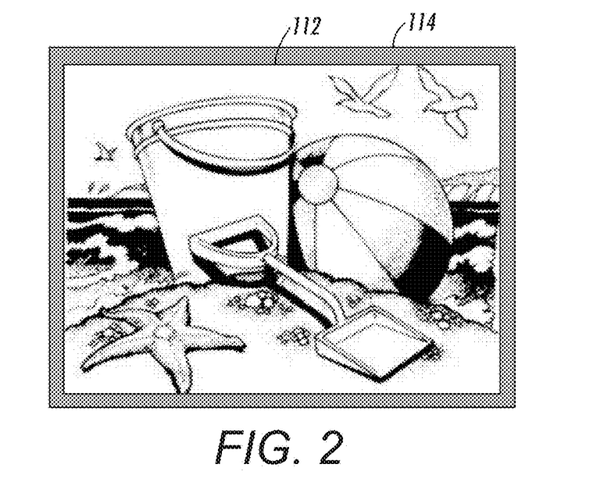
FIG. 2 is a schematic diagram illustrating an electronic image.
Figure 3:
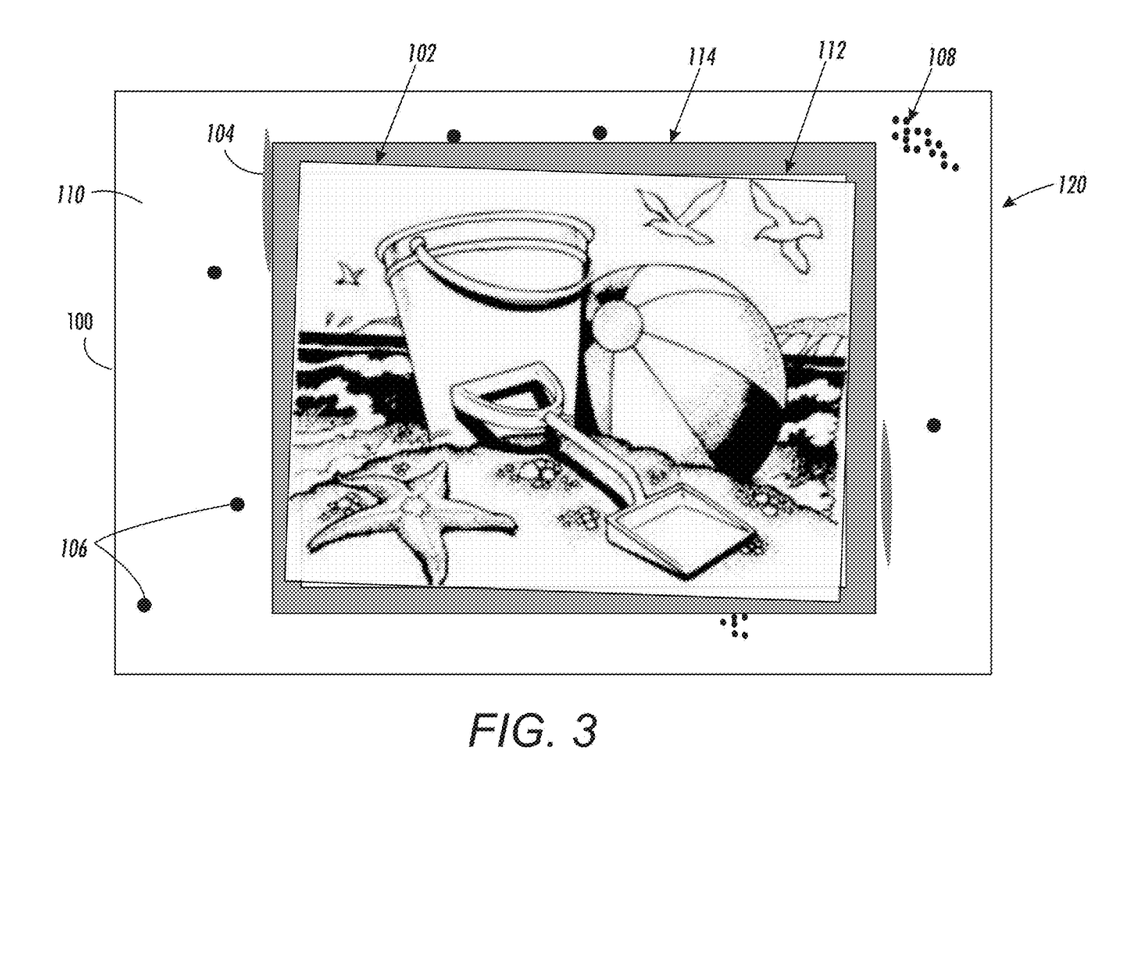
FIGS. 3-6 are schematic diagrams illustrating electronic images.

FIG. 2 is a schematic diagram illustrating the electronic original image 112 and a border 114, and FIG. 3 shows an electronic overlay image 120 having the electronic original image 112 and border 114 (shown in FIG. 2) overlaid on the scanned image 100 (shown in FIG. 1). As shown in FIG. 2, the systems and methods herein automatically add a border 114 to the electronic original image 112 (e.g., in the electronic overlay image 120 show in FIG. 3) to modify the electronic original image 112 into an enlarged original image 112+114, again using the processor. Additionally, as shown in FIG. 3, such systems and methods overlay the electronic original image 112 on an area of the electronic scanned image 100 where the image markings 102 are located to produce the electronic overlay image 120, using the processor.

In this processing, the processor sets the size of the electronic original image 112 to be the same size as the image markings 102 in the electronic overlay image 120. However, the border 114 is larger than the electronic original image 112 in the electronic overlay image 120. For example, the border 114 increases the size of the electronic image by at least 10%, at least 20%, at least 30%, etc.

Figure 4:
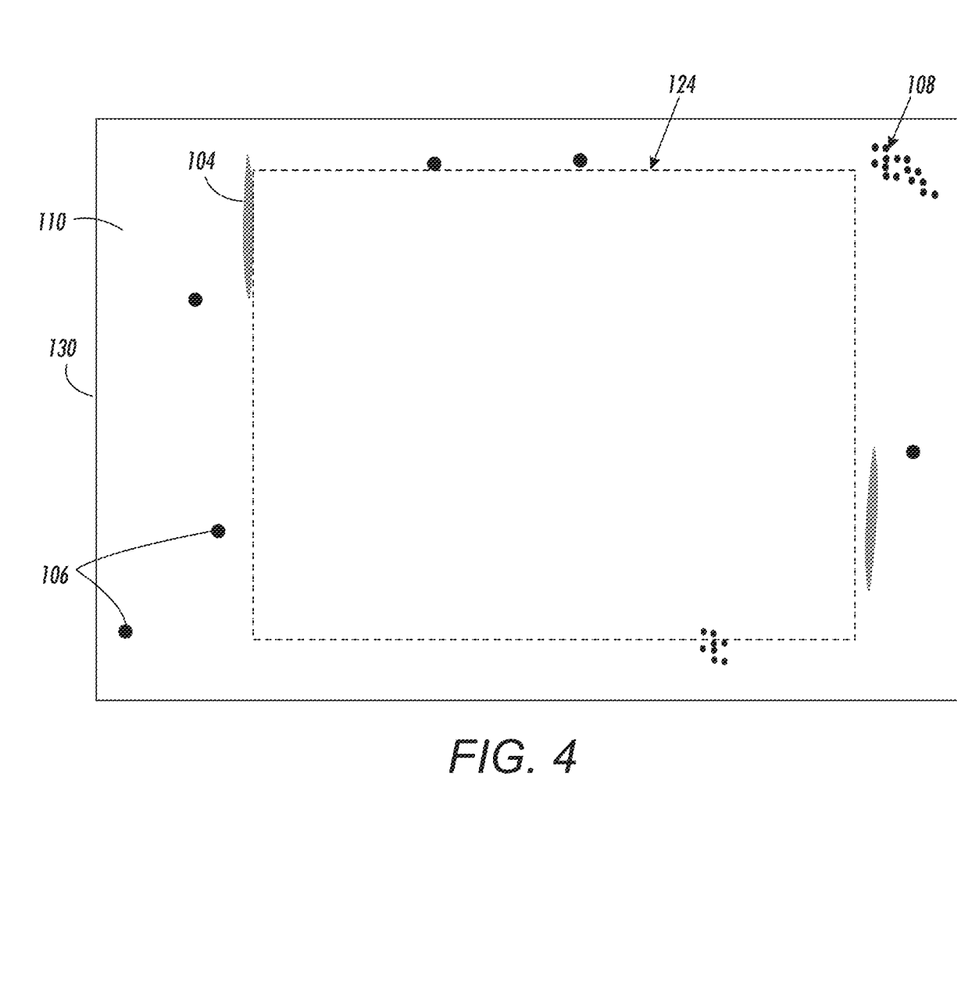

As shown in FIG. 4, the systems and methods herein also automatically remove markings from an area 124 of the electronic overlay image 120 where the enlarged original image 112+114 is positioned (using the processor) to produce an electronic white space image 130, for example by replacing the entire area occupied by the enlarged original image 112+114 with white pixels.

Figure 5:
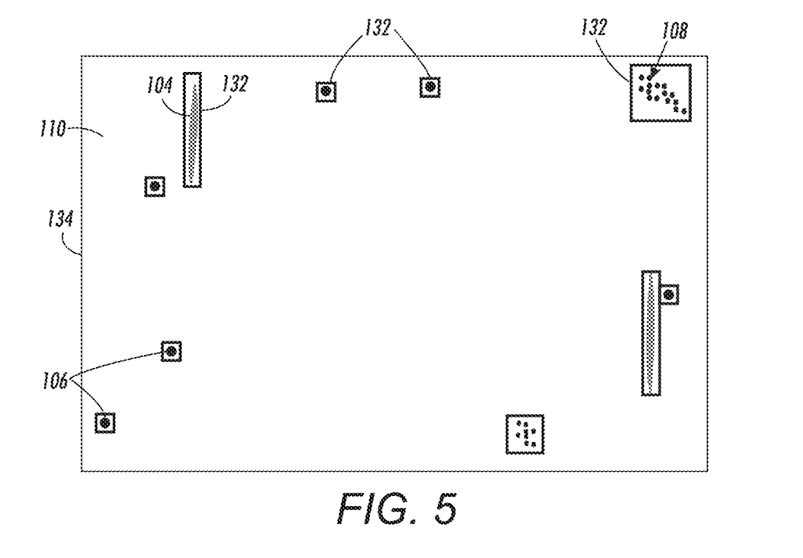

Then these systems and methods automatically detect defects 104, 106, 108 in the electronic white space image 130 by identifying non-white pixels in the electronic white space image 130, again, using the processor. Further, as shown in FIG. 5 such systems and methods automatically highlight these defects 104, 106, 108 by adding highlight markings 132 to the electronic white space image 130, where the defects 104, 106, 108 are located, to produce an electronic defect image 134, using the processor. For example, as shown in FIG. 5, the highlight markings 132 comprise geometric shapes enclosing the defects 104, 106, 108.

Figure 6:
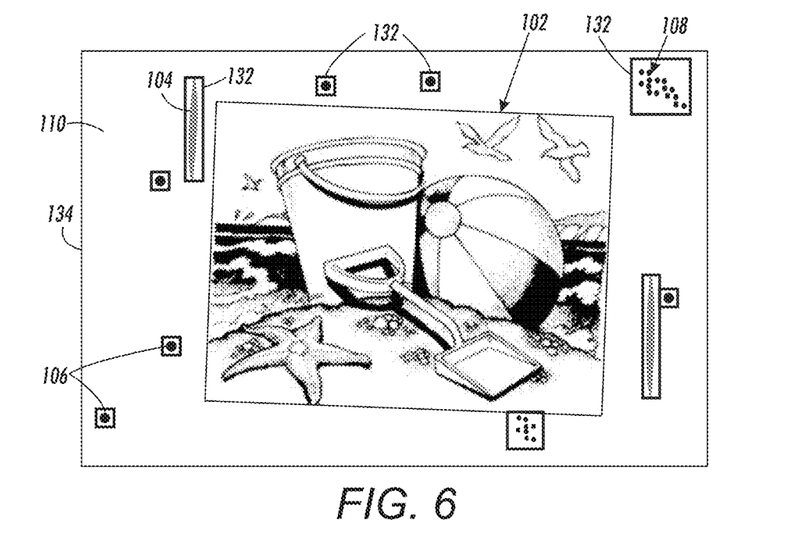

The image markings 102 can be included in the electronic defect image 134, as shown in FIG. 6, if desired before being output to the user. Thus, these systems and methods automatically display the electronic defect image 134, using a display device operatively connected to the processor.

Figure 7:
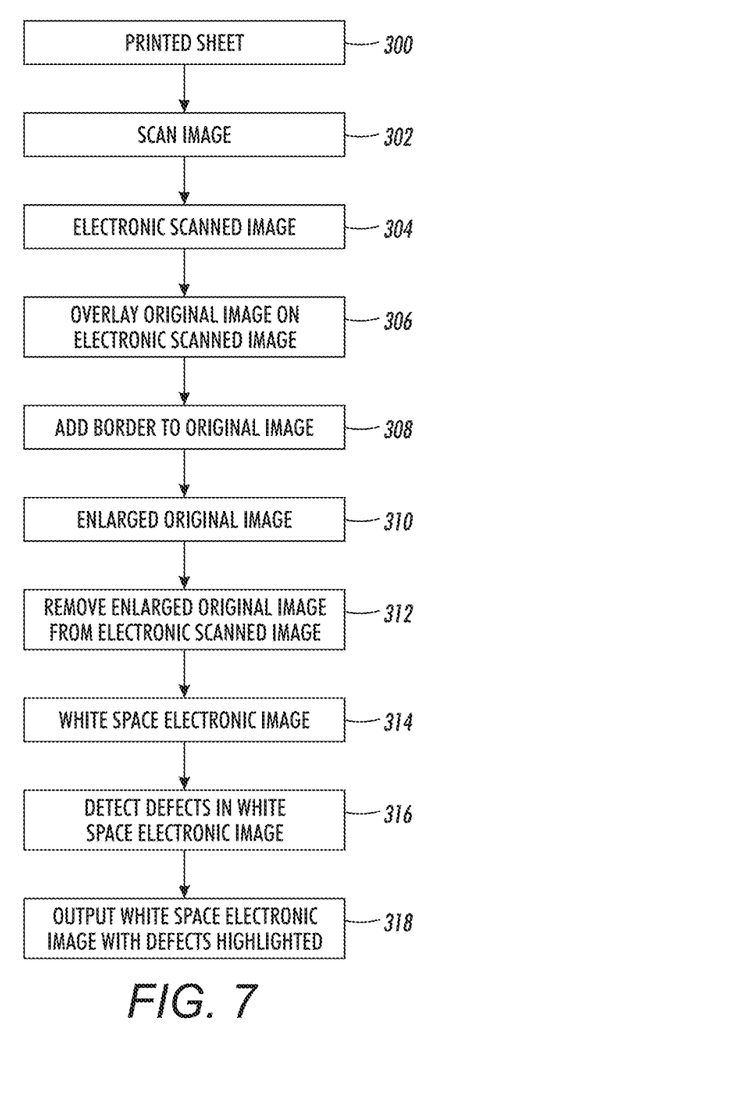
FIG. 7 is a flow diagram of various methods herein.

FIG. 7 is flowchart illustrating exemplary methods herein. In item 300, these methods can print an electronic original image to produce a printed sheet by printing image markings corresponding to the electronic original image on print media, using a printing engine, or can receive a previously printed sheet. The printed sheet has the image markings and white space in areas outside the areas of the image markings. Therefore, the white space is unprinted areas of the printed sheet.

In item 302, the methods herein can automatically or manually scan the printed sheet using a scanner (potentially positioned to automatically receive the printed sheet from the printing engine). The scanner therefore produces an electronic scanned image 304. These methods automatically or manually receive the electronic scanned image from the scanner into a processor (that is operatively connected to the scanner and the printing engine). The processor also stores the electronic original image.

In item 306, such methods can then automatically overlay the electronic original image on an area of the electronic scanned image where the image markings are located to produce an electronic overlay image, using the processor. In this processing, the processor sets the size of the electronic original image to be the same size as the image markings in the electronic overlay image.

In addition, in item 308, these methods automatically add a border to the electronic original image in the electronic overlay image to modify the electronic original image into an enlarged original image 310 in the electronic overlay image, again using the processor. The border is larger than the electronic original image in the electronic overlay image. For example, the border increases the size of the electronic image by at least 10%, at least 20%, at least 30%, etc.

In item 312, these methods also automatically remove the enlarged original image from the electronic overlay image by removing all markings from an area of the electronic overlay image where the enlarged original image is positioned (using the processor) to produce an electronic white space image 314. The processing in item 312 is accomplished by, for example by replacing the area of the enlarged original image with white pixels.

Then, in item 316 these methods automatically detect defects in the electronic white space image by identifying non-white pixels in the electronic white space image, again, using the processor. Further, in item 316, such methods automatically highlight these defects by adding highlight markings to the electronic white space image, where the defects are located, to produce an electronic defect image, using the processor. For example, the highlight markings comprise geometric shapes enclosing the defects. Thus, these methods can automatically display the electronic defect image in item 318, using a display device operatively connected to the processor.

Figure 10:
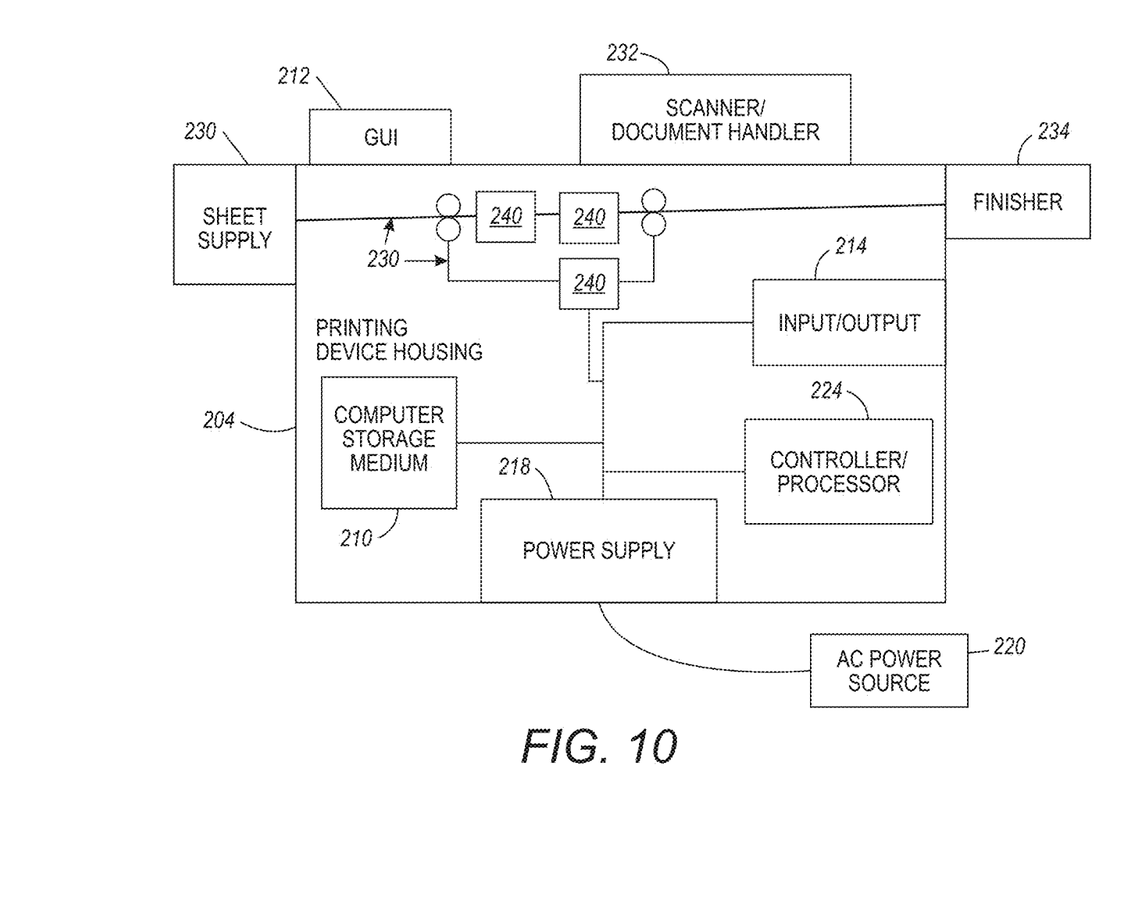
FIG. 10 is a schematic diagram illustrating devices herein.

Therefore, as shown above, apparatuses herein include machines, printers, systems, etc., and such apparatuses include, among other components, a printing engine 240 printing an electronic original image. Such printing is performed by printing image markings corresponding to the electronic original image on print media to produce a printed sheet. The printed sheet has the image markings and white space (unprinted areas of the printed sheet). In addition, such apparatuses include a scanner 232 positioned to automatically receive the printed sheet from the printing engine 240, a processor 224 operatively connected to the scanner 232 and the printing engine 240, a display device 212 operatively connected to the processor 224, etc. The processor 224 stores the electronic original image.

The scanner 232 produces an electronic scanned image by scanning the printed sheet, and the processor 224 receives the electronic scanned image from the scanner 232. The processor 224 overlays the electronic original image on an area of the electronic scanned image where the image markings are located to produce an electronic overlay image. The electronic original image has the same size as the image markings in the electronic overlay image. The processor 224 also adds a border to the electronic original image in the electronic overlay image to modify the electronic original image into an enlarged original image in the electronic overlay image. For example, the border increases the size of the electronic image by at least 10%, at least 20%, at least 30%, etc.

The processor 224 removes markings from an area of the electronic overlay image where the enlarged original image is positioned (e.g., by replacing the enlarged original image with white pixels) to produce an electronic white space image. The processor 224 detects defects in the electronic white space image by identifying non-white pixels in the electronic white space image. The processor 224 highlights the defects by adding highlight markings (e.g., geometric shapes enclosing the defects) to the electronic white space image where the defects are located to produce an electronic defect image. The display device 212 displays the electronic defect image.

The hardware described herein plays a significant part in permitting the foregoing method to be performed, rather than function solely as a mechanism for permitting a solution to be achieved more quickly, (i.e., through the utilization of a computer for performing calculations).

As would be understood by one ordinarily skilled in the art, the processes described herein cannot be performed by a human alone (or one operating with a pen and a pad of paper) and instead such processes can only be performed by a machine (especially when the volume of data being processed, and the speed at which such data needs to be evaluated is considered). For example, if one were to manually attempt to perform the classification processing performed by the models discussed above, the manual process would be sufficiently inaccurate and take an excessive amount of time so as to render the manual classification results useless. Specifically, processes such as receiving electronic data streams, updating automated models, using the models to automatically label data instances, electronically storing data instances, etc., requires the utilization of different specialized machines, and humans performing such processing would not produce useful results because of the time lag, inconsistency, and inaccuracy humans would introduce into the results.

As would be understood by one ordinarily skilled in the art, the processes described herein cannot be performed by human alone (or one operating with a pen and a pad of paper) and instead such processes can only be performed by a machine. Specifically, processes such as encryption, electronic transmission of data over networks, etc., requires the utilization of different specialized machines. Therefore, for example, the encryption/decryption performed by the user device cannot be performed manually (because it would take decades or lifetimes) and is integral with the processes performed by methods herein. Further, such machine-only processes are not mere "post-solution activity" because the encryption safeguards the data during electronic transmission and such data is further processed after it is transmitted and decrypted. Similarly, the electronic transmissions of each half of the transaction (the provider's half and the user's half) utilize special-purpose equipment (telecommunications equipment, routers, switches, etc.) that are distinct from a general-purpose processor. Also, the data transmission is integral with the process performed by the methods herein, and is not mere post-solution activity, because the post-transmission processes of the methods herein rely upon the previous transmission, and cannot be performed without such electronic transmission. In other words, these various machines are integral with the methods herein because the methods cannot be performed without the machines (and cannot be performed by humans alone).

Additionally, the methods herein solve many highly complex technological problems. For example, as mentioned above, providers suffer from the technological problem of not being fully capable of effectively safeguarding electronically stored user data on computer storage media (and data breaches of seemingly secure systems commonly occur). Methods herein solve this technological problem by avoiding the need for providers to store any personal or financial information of the user (as such data is never supplied to the providers). This reduces the amount of electronic storage that a provider must maintain, and also reduces the technological security updates that a provider is required to satisfy. By granting such benefits to providers, the methods herein reduce the amount and complexity of hardware and software needed to be purchased, installed, and maintained by providers, thereby solving a substantial technological problem that providers experience today.

Similarly, with respect to the users, the methods herein additionally solve many technological problems related to the security of user information. By limiting the need for the user or the provider to maintain any personal or financial information of the user (as all such information can be maintained by secure data storage systems of the intermediate entity) hardware storage and software security elements for the user can be substantially reduced. In other words, because the user does not maintain any personal or financial information on the user device, the technology of the user device can be substantially simplified, thereby reducing cost, weight, size, etc., and providing many substantial technological benefits to the user.

Figure 8:
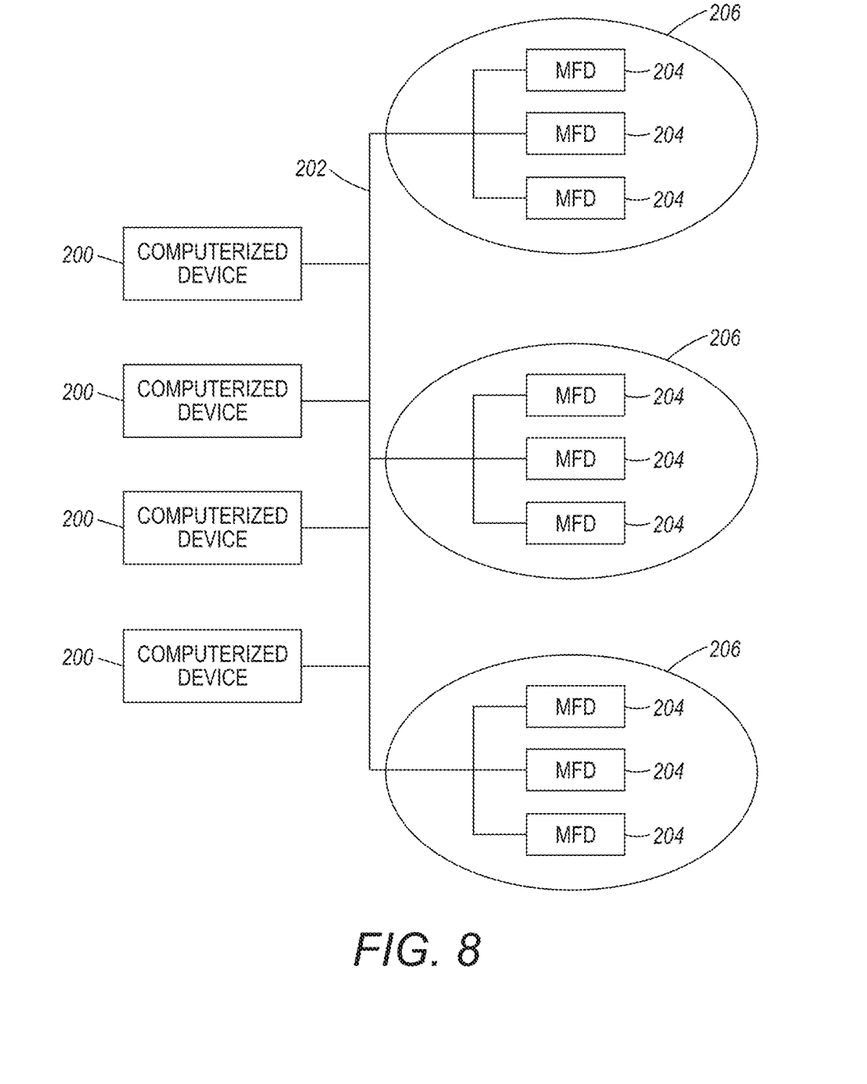
FIG. 8 is a schematic diagram illustrating systems herein.

As shown in FIG. 8, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 9:
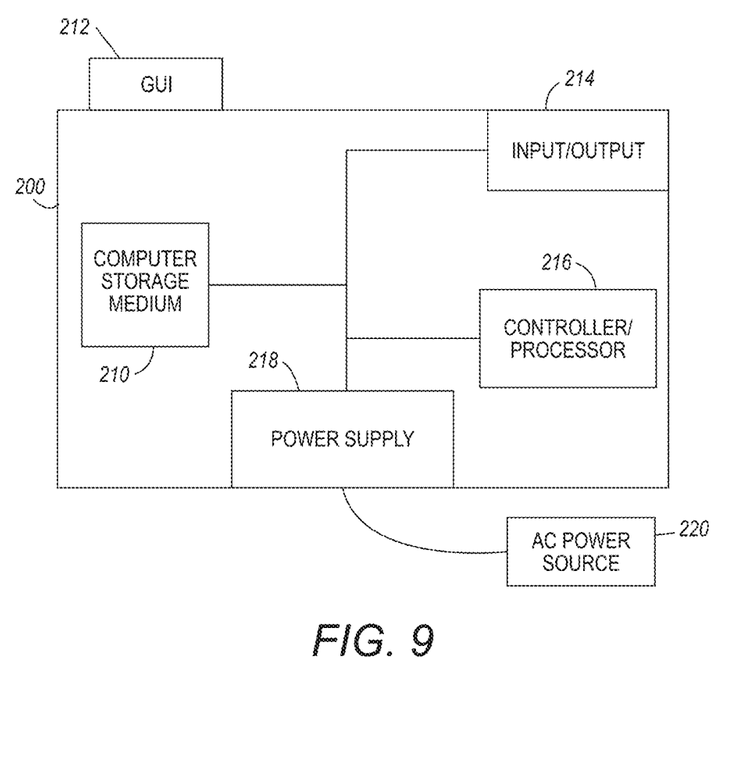
FIG. 9 is a schematic diagram illustrating devices herein.

FIG. 9 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 9, a body housing has one or more functional components that operate on power supplied from an alternating current (AC) source 220 by the power supply 218. The power supply 218 can comprise a common power conversion unit, power storage element (e.g., a battery, etc), etc.

FIG. 10 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt or devices that print directly to print media (e.g., inkjet printers, ribbon-based contact printers, etc.).

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The various sets of instructions that are executed by a computerized processor to perform the methods described herein can be any form of computerized application, such as an API, a platform API workflow program, a specialty application, etc., all of which are referred to herein simply as "application" for shorthand. A print job includes a set of data that is to be printed, and can include images, graphics, and text from a variety of formats. In addition to the print data that will actually be printed on the print media, the print job also includes various commands controlling the printing; and such commands identify the printer to be used, the resolution of printing, the media type and size to be used, color characteristics, gloss characteristics, finishing operations to be performed, destinations of the printed pages, etc. A raster image processor (RIP) is a component used in a printing system that produces a raster image also known as a bitmap from the print job. The bitmap is then sent to a printing device for output. Raster image processing is the process that turns vector digital information into a high-resolution raster image.

A "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   automatically scanning a printed sheet using a scanner to produce an electronic scanned image, said printed sheet had said image markings corresponding to an electronic original image and white space;
   automatically receiving, by a processor operatively connected to said scanner and said printing engine, said electronic scanned image from said scanner;
   automatically overlaying, by said processor, said electronic original image on an area of said electronic scanned image where said image markings are located to produce an electronic overlay image;
   automatically adding, by said processor, a border to said electronic original image in said electronic overlay image to modify said electronic original image into an enlarged original image in said electronic overlay image;
   automatically removing, by said processor, markings from an area of said electronic overlay image where said enlarged original image is positioned to produce an electronic white space image;
   automatically detecting, by said processor, defects in said electronic white space image;
   automatically highlighting, by said processor, said defects by adding highlight markings to said electronic white space image where said defects are located to produce an electronic defect image; and
   automatically displaying, by a display device operatively connected to said processor, said electronic defect image.

2. The method according to claim 1, said border increases the size of said electronic image by at least 10%.

3. The method according to claim 1, said removing said markings from said area of said electronic overlay image where said enlarged original image is positioned, comprises replacing said enlarged original image with white pixels.

4. The method according to claim 1, said highlight markings comprise geometric shapes enclosing said defects.

5. The method according to claim 1, further comprising storing, by said processor, said electronic original image.

6. The method according to claim 1, said white space comprises unprinted areas of said printed sheet.

7. The method according to claim 1, said border is larger than said electronic original image in said electronic overlay image.

8. A method comprising:
   printing an electronic original image by printing image markings corresponding to said electronic original image on print media using a printing engine to produce a printed sheet, said printed sheet has said image markings and white space;
   automatically scanning said printed sheet using a scanner positioned to automatically receive said printed sheet from said printing engine, said scanner producing an electronic scanned image;
   automatically receiving, by a processor operatively connected to said scanner and said printing engine, said electronic scanned image from said scanner;
   automatically overlaying, by said processor, said electronic original image on an area of said electronic scanned image where said image markings are located to produce an electronic overlay image, said electronic original image has the same size as said image markings in said electronic overlay image;
   automatically adding, by said processor, a border to said electronic original image in said electronic overlay image to modify said electronic original image into an enlarged original image in said electronic overlay image;
   automatically removing, by said processor, markings from an area of said electronic overlay image where said enlarged original image is positioned to produce an electronic white space image;
   automatically detecting, by said processor, defects in said electronic white space image by identifying non-white pixels in said electronic white space image;
   automatically highlighting, by said processor, said defects by adding highlight markings to said electronic white space image where said defects are located to produce an electronic defect image; and automatically displaying, by a display device operatively connected to said processor, said electronic defect image.

9. The method according to claim 8, said border increases the size of said electronic image by at least 10%.

10. The method according to claim 8, said removing said markings from said area of said electronic overlay image where said enlarged original image is positioned, comprises replacing said enlarged original image with white pixels.

11. The method according to claim 8, said highlight markings comprise geometric shapes enclosing said defects.

12. The method according to claim 8, further comprising storing, by said processor, said electronic original image.

13. The method according to claim 8, said white space comprises unprinted areas of said printed sheet.

14. The method according to claim 8, said border is larger than said electronic original image in said electronic overlay image.

15. A system comprising:
- a printing engine printing an electronic original image by printing image markings corresponding to said electronic original image on print media to produce a printed sheet, said printed sheet has said image markings and white space;
- a scanner positioned to automatically receive said printed sheet from said printing engine, said scanner producing an electronic scanned image by scanning said printed sheet;
- a processor operatively connected to said scanner and said printing engine; and
- a display device operatively connected to said processor,
- said processor receives said electronic scanned image from said scanner,
- said processor overlays said electronic original image on an area of said electronic scanned image where said image markings are located to produce an electronic overlay image,
- said electronic original image has the same size as said image markings in said electronic overlay image,
- said processor adds a border to said electronic original image in said electronic overlay image to modify said electronic original image into an enlarged original image in said electronic overlay image,
- said processor removes markings from an area of said electronic overlay image where said enlarged original image is positioned to produce an electronic white space image,
- said processor detects defects in said electronic white space image by identifying non-white pixels in said electronic white space image,
- said processor highlights said defects by adding highlight markings to said electronic white space image where said defects are located to produce an electronic defect image, and
- said display device displays said electronic defect image.

16. The system according to claim 15, said border increases the size of said electronic image by at least 10%.

17. The system according to claim 15, said processor removes said markings from said area of said electronic overlay image where said enlarged original image is positioned by replacing said enlarged original image with white pixels.

18. The system according to claim 15, said highlight markings comprise geometric shapes enclosing said defects.

19. The system according to claim 15, said processor stores said electronic original image.

20. The system according to claim 15, said white space comprises unprinted areas of said printed sheet.

* * * * *